United States Patent Office.

DANIEL SPILL, OF PARADISE TERRACE, HACKNEY, ENGLAND.

Letters Patent No. 97,454, dated November 30, 1869.

IMPROVEMENT IN DISSOLVING XYLOIDINE FOR USE IN THE ARTS.

The Schedule referred to in these Letters Patent and making part of the same.

*To whom it may concern:*

Be it known that I, DANIEL SPILL, of Paradise Terrace, Hackney, in the county of Middlesex, England, have invented certain new and useful "Improvements in the Preparation and Use of Solvents of Xyloidine, so as to render the same more suitable for industrial applications;" and I hereby declare the following to be a full, clear, and exact description of the same.

This invention relates to the preparation and use of certain solvents of xyloidine, and which differ from the ordinary or known solvents of xyloidine, in that these menstrua, which are employed, are not necessarily in themselves solvents of xyloidine, but become so by the addition of the bodies, compounds, or substances herein referred to.

The solvents, among other applications, may be employed in conjunction with my invention for improvements in compounds containing xyloidine in these processes, which are described in Letters Patent, granted to me, No. 91,377, dated June 15, 1869, and as substitutes for the non-volatile solvents therein described; and This invention consists in the employment—

First, of camphor, or of camphor-oil, or mixtures of the same, in conjunction with hydrocarbons, or of such volatile products as exist in or are obtained from the distillation of petroleum, or the volatile products obtained by the distillation of the residual products resulting from the distillation of coal, shale, or other bituminous substances, and which volatile products have a boiling-point or boiling points from about 220° to about 400° Fahrenheit, the same to be employed in about equal proportions.

Second, of camphor, or camphor-oil, or mixture of the same, in conjunction with alcohol or spirits of wine, the same to be employed in about equal proportions.

Thirdly, of hydrocarbons, having a boiling-point ranging from 220° to 400° Fahrenheit, in conjunction with alcohol or spirits of wine in about equal proportions.

Fourthly, of castor-oil, of camphor, or of camphor-oil, or of mixtures of the same, in conjunction with alcohol or spirits of wine in about equal proportions.

Fifthly, of the admixture of camphor, or of camphor-oil, or mixtures of the same with hydrocarbons, such as before referred to, in conjunction with alcohol or spirits of wine, all in about the same proportions, and the employment of the same, either as a simple admixture, or, by preference, of the distillate of such mixture.

Sixthly, of the admixture of camphor, or of camphor-oil, or mixtures of the same with bisulphide of carbon, in conjunction with alcohol or spirits of wine, all in about the same proportions, and the employment of the same either as a simple admixture, or, by preference, of the distillate of such mixture.

Seventhly, aldehyde, either alone or in conjunction with alcohol or spirits of wine, in about equal proportions, and the employment of the same, either as a simple admixture, or, by preference, of the distillate of such mixture.

Eighthly, of the employment of any two or more of any of the before-mentioned solvents, either in the proportion of about equal parts, or in other proportions.

In all of those instances in which the word "alcohol" is mentioned, it is to be understood that methylated spirit may be substituted.

According to one method of applying my invention, I dissolve the xyloidine in any of the before-mentioned solvents or mixtures of the same, and then incorporate the solution of, or the softened xyloidine, with animal, fish, vegetable, or mineral-oils, oxidized or otherwise, such, for example, as lard-oil, cod-liver oil, castor-oil, tar-oil, or heavy coal-oils, or with mixtures of the same, together with the admixture of other ingredients, such as paraffine, camphor, resins, fat, wax, or mixtures of the same, so as to produce a material or materials which may be employed either alone or in conjunction with pigments or other inert bodies, for the production of a compound or compounds, which may be applied for useful purposes in the arts.

The xyloidine may be dissolved while in a hydrated condition, but it is by preference to be previously dried or deprived of moisture by any of the well-known methods.

The consistency of the product will be dependent on the proportions of the several ingredients employed. Thus, for example, when I wish to obtain a material suitable for the covering or protecting of telegraph-wires, or for moulding, rolling, or spreading, I have found that the several materials employed in about the following proportions, viz, xyloidine, twenty-seven parts by weight; castor-oil, twenty-seven parts by weight; camphor, six parts by weight; solvents, either of the Nos. 1, 2, 3, 4, 5, 6, 7, 8, forty parts by weight; equal to one hundred parts by weight.

When it is desired to obtain a material which shall possess greater or less flexibility, or greater or less fluidity, then I increase or decrease the proportion or character of the oil or oils until the desired properties are obtained.

What I wish to secure as my invention, is—

The preparation and use of solvents of xyloidine, such as have been before described, so as to render xyloidine more easy of conversion into compounds containing xyloidine, which are suitable for applications in the arts, and for industrial purposes.

In testimony whereof, I have signed my name to this specification, in the presence of two subscribing witnesses.

DANIEL SPILL.

Witnesses:
HENRY STEVENS,
CHAS. MILLS,
*Clerks to Mr. J. Henry Johnson,*
*47 Lincolns Inn Fields, Middlesex, England.*